3,355,245
PROCESS FOR PRODUCING COPPER TELLURIDE
Runyon G. Ernst, Woodbridge, N.J., assignor to American Metal Climax, Inc., New York, N.Y., a corporation of New York
No Drawing. Filed Oct. 6, 1964, Ser. No. 402,016
10 Claims. (Cl. 23—50)

ABSTRACT OF THE DISCLOSURE

A process for producing CuTe by adding particulate copper to a sulfuric acid solution having a temperature of at least 60° C. and containing tellurium dioxide in an amount in excess of its solubility in the solution so that CuTe is precipitated therefrom.

---

The present invention is directed to an improved process for producing copper telluride.

Copper telluride is commonly used as an additive to copper to produce alloys having improved machining characteristics. Copper telluride has been prepared by the high temperature reduction of tellurium dioxide with carbon in the presence of copper in a graphite crucible. The high temperatures of about 700–800° C. involved in the conventional tellurium dioxide reduction process usually occasion substantial tellurium losses.

It is an object of this invention to provide a novel process for producing copper telluride. It is a further object of this invention to provide a low temperature process for producing copper telluride. It is a still further object of this invention to provide an economical process for producing copper telluride. Other objects and advantages of this invention will in part be obvious and will in part appear hereinafter.

This invention contemplates producing copper telluride as a precipitate from an aqueous solution containing tellurium dioxide and sulfuric acid, by the addition of copper. The overall reaction follows:

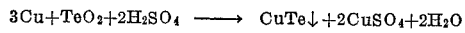

$$3Cu + TeO_2 + 2H_2SO_4 \longrightarrow CuTe\downarrow + 2CuSO_4 + 2H_2O$$

The rate of reaction increases with increasing temperature to the boiling point of the reaction mixture. Initially, and before the addition of copper, heating is applied to raise the temperature of the system to at least 60° C. and more suitably to between 70–90° C. to enable the subsequent reduction reaction to proceed rapidly. The reduction reaction being exothermic, the heat of reaction resulting from the adding of copper eliminates any further need for heat from external sources. It is preferred that the system be brought initially to about 90° C. before addition of the copper whereby a very rapid increase in temperature to the boiling point of the mixture may be readily obtained upon commencing copper addition.

Tellurium dioxide ($TeO_2$) has relatively slight solubility in acidified aqueous solutions. In the procedure for producing copper telluride in accordance with this invention, tellurium dioxide is in the reaction mixture in an amount in excess of its solubility. This excess tellurium dioxide is initially present as a solid phase. It is in finely subdivided form and the reaction mixture is maintained as a slurry by vigorous agitation. As the copper telluride is precipitated by reduction of the dissolved $TeO_2$ with copper, this allows additional tellurium dioxide to dissolve from the solid phase. Due to the exothermic nature of the reaction, once boiling has commenced, the maximum rate of copper addition should be such that a vigorous boiling rate is maintained without incurring excessive foaming. If an excessive copper feed rate is used, the reaction may become unduly vigorous resulting in the reaction mixture foaming out of the reaction vessel.

The amount of copper required is determined by the stoichiometry of the reaction. Little, if any, excess of copper is required. For a rapid reaction rate, it is desirable that the copper be in particulate form, the use of powder being preferred although copper sponge, copper turnings and chips, comminuted scrap copper and the like may be used instead of or in conjunction with copper powder. As used herein, the term "copper in particulate form" shall mean any of the metallic copper materials of the types hereinabove mentioned presenting ample surface area for effective utilization in the reduction reaction.

In the preferred process, the reaction mixture is made up with between about 350 g./l. and 450 g./l. of sulfuric acid. It is important that the copper sulfate produced in the process be kept in solution since if allowed to crystallize it becomes admixed with the desired copper telluride product and may further coat the unreacted $TeO_2$ and thereby prevent complete reaction. At concentrations above about 450 g./l. of sulfuric acid, the solubility of the copper sulfate is depressed to the extent that copper sulfate may crystallize during the reaction causing the aforementioned difficulties. If the initial acid concentration is below about 350 g./l. of sulfuric acid, the reaction velocity becomes retarded and, if too low, the reaction may not go to completion.

The tellurium dioxide concentration in the reaction mixture may be varied widely. The optimum tellurium dioxide concentration is governed by the solubility considerations specified hereinbefore as well as the stoichiometry of the reaction. It is preferred that the tellurium dioxide concentration be about 200 g./l. If the concentration is less than about 200 g./l., the utilization of sulfuric acid becomes less efficient. At higher concentrations, the tellurium dioxide may not be fully utilized at the sulfuric acid levels contemplated.

As noted hereinbefore, the reaction is preferably carried out above about 90° C., up to the boiling point of the reaction mixture (about 107–110° C. for the preferred reaction mixture). The elevated temperatures are also useful for maintaining the copper sulfate in solution. The reaction mixture may be made up by forming a slurry of the tellurium dioxide in water, agitating, and heating to a temperature of about 70° C. Acid is then added causing an increase in temperature to about 90° C. Alternatively, the tellurium dioxide may be added to an aqueous sulfuric acid solution as illustrated in the example hereinafter presented. Agitation is maintained during the copper addition and for a brief period, e.g., five minutes thereafter. The reaction mixture comprising the precipitated copper telluride and copper sulfate containing solution is then processed while still hot to effect removal of the precipitate from said solution utilizing any desired separation means such as decantation, filtration, etc., said solution being subsequently treated, if desired, for recovery of its copper sulfate content. The copper telluride precipitate after washing with water to remove soluble salts therefrom is thereafter dried to provide the desired product.

The following example further illustrates the invention:

A one liter aqueous solution was made up containing 400 grams of $H_2SO_4$. Tellurium dioxide, 200 grams, was added to the solution with vigorous agitation. The reaction mixture was then heated to 90° C. Scrap copper powder (minus 20, plus 40 mesh) 239 grams, was gradually added with vigorous agitation. The rate of addition was controlled to prevent excessive boiling with its attendant foaming difficulties. At the completion of the copper addition, the agitation was maintained for an additional five minutes and then stopped. The copper sulfate solution was promptly decanted. The precipitated material was filtered while still hot and then washed free of salts with water. The products are 240 grams of copper telluride; 402 grams of copper sulfate; 154 grams of sulfuric acid; and the balance water and soluble impurities.

The copper telluride produced is of relatively high purity. Most of the impurities normally associated with tellurium dioxide, copper, and the acid either remain in solution in the reaction mixture or are readily washed from the precipitated copper telluride. However, selenium, if present, goes to the copper telluride.

The process of this invention is economical of labor, raw materials and equipment. The reaction is rapid and highly efficient with the yield of copper telluride being substantially quantitative. The reaction volume requirements are small yet permit high production rates through the equipment. The product produced is generally of sufficient purity to meet all present comercial standards.

As various embodiments of this invention may be made without departing from the spirit and scope thereof, it is to be understood that the invention includes all such modifications and variations as come within the scope of the appended claims.

What is claimed is:

1. A process for producing copper telluride in the form of CuTe comprising precipitating CuTe by adding copper in particulate form to an aqueous sulfuric acid solution having a temperature of at least 60° C. and containing tellurium dioxide in an amount in excess of its solubility in said solution and recovering said precipitated CuTe therefrom.

2. The process for producing copper telluride in the form of CuTe comprising adding copper in particulate form to an agitated aqueous sulfuric acid solution at a temperature above about 70° C., said solution containing dissolved tellurium dioxide and additional tellurium dioxide present as a solid phase whereby copper telluride is precipitated in the reaction mixture, and recovering said precipitated copper telluride therefrom.

3. The process of claim 2 wherein said temperature is above 90° C.

4. The process for producing copper telluride comprising adding copper in particulate form to an agitated aqueous solution heated to a temperature of at least 70° C., said solution containing
  (i) between 350 g./l. and 450 g./l. of $H_2SO_4$, and
  (ii) being saturated with $TeO_2$ and also containing $TeO_2$ in an amount in excess of its solubility present as a solid phase,
whereby copper telluride is precipitated, and recovering said precipitated copper telluride.

5. The process of claim 4 wherein said temperature is in excess of 90° C.

6. The process of claim 5 wherein the concentration of tellurium dioxide is about 200 g./l.

7. The process of claim 6 wherein the precipitated copper telluride is recovered from the reaction mixture by filtering and then washing with water.

8. The process for preparing copper telluride in the form of CuTe comprising preparing an aqueous acid solution containing between about 350 g./l. and 450 g./l. of $H_2SO_4$, and about 200 g./l. of finely subdivided $TeO_2$ largely present as a solid phase, heating the resulting slurry to a temperature above about 70° C., vigorously agitating said slurry while simultaneously and continuously adding copper powder at a controlled rate thereto whereby copper telluride is precipitated and the aqueous solution is brought to boiling, continuing the copper addition until the $TeO_2$ reduction is completed, decanting the liquid while still hot, filtering the copper telluride precipitate while still hot and then washing said precipitate with water to remove residual soluble salts therefrom.

9. The process of claim 8 wherein said solution is at a temperature of about 90° C. when the copper is added.

10. The process of claim 9 wherein the said solution contains about 400 g./l. of $H_2SO_4$.

References Cited

UNITED STATES PATENTS 2,981,595   4/1961   Tuwiner _____ 23—50

OSCAR R. VERTIZ, *Primary Examiner.*

H. T. CARTER, *Assistant Examiner.*